United States Patent
Berkovich et al.

(10) Patent No.: US 8,538,078 B2
(45) Date of Patent: Sep. 17, 2013

(54) SYSTEM FOR USING THREE-DIMENSIONAL MODELS TO ENABLE IMAGE COMPARISONS INDEPENDENT OF IMAGE SOURCE

(75) Inventors: Erez Berkovich, Kfar Biyalik (IL); Dror Shapira, Kfar Biyalik (IL)

(73) Assignee: Rafael Advanced Defense Systems Ltd., Haifa (IL)

( * ) Notice: Subject to any disclaimer, the term of this patent is extended or adjusted under 35 U.S.C. 154(b) by 188 days.

(21) Appl. No.: 13/141,696

(22) PCT Filed: Dec. 10, 2009

(86) PCT No.: PCT/IB2009/055653
§ 371 (c)(1),
(2), (4) Date: Jun. 23, 2011

(87) PCT Pub. No.: WO2010/073171
PCT Pub. Date: Jul. 1, 2010

(65) Prior Publication Data
US 2011/0255746 A1    Oct. 20, 2011

(30) Foreign Application Priority Data
Dec. 24, 2008    (IL) .......................................... 196162

(51) Int. Cl.
*G06K 9/00*    (2006.01)
*G06T 15/00*    (2011.01)

(52) U.S. Cl.
USPC ............................................ 382/103; 345/419

(58) Field of Classification Search
USPC ................. 382/103, 115, 116, 117, 118, 236, 382/280, 318, 107, 154, 285; 348/169, 170, 348/171, 172, 208.1, 208.2, 161, 208.16; 345/418, 419, 420, 664, 665
See application file for complete search history.

(56) References Cited

U.S. PATENT DOCUMENTS

| 6,002,782 | A  | * | 12/1999 | Dionysian ...................... 382/118 |
| 6,035,074 | A  |   | 3/2000  | Fujimoto et al. |
| 7,221,809 | B2 | * | 5/2007  | Geng ............................. 382/280 |
| 7,620,218 | B2 | * | 11/2009 | Steinberg et al. ............. 382/118 |
| 7,657,083 | B2 | * | 2/2010  | Parr et al. ...................... 382/155 |
| 7,876,931 | B2 |   | 1/2011  | Geng |

* cited by examiner

*Primary Examiner* — Abolfazl Tabatabai
(74) *Attorney, Agent, or Firm* — Mark M. Friedman

(57) ABSTRACT

A method for identifying an object based at least in part on a reference database including two-dimensional images of objects includes the following steps: (a) providing a three-dimensional model reference database containing a plurality of estimated three-dimensional models, wherein each estimated three-dimensional model is derived from a corresponding two-dimensional image from the two-dimensional reference database; (b) sampling at least one image of an object to be identified; (c) implementing at least one identification process to identify the object, the identification process employing data from the three-dimensional model reference database.

27 Claims, 9 Drawing Sheets

SYSTEM FOR USING THREE-DIMENSIONAL MODELS TO ENABLE IMAGE COMPARISONS INDEPENDENT OF IMAGE SOURCE

FIELD OF THE INVENTION

The present invention generally relates to a system for using three-dimensional models to enable image comparisons independent of image source, and in particular enabling the use of the large infrastructure of existing two-dimensional databases for increased success in recognition.

BACKGROUND OF THE INVENTION

Currently there is a large infrastructure of existing two-dimensional image databases. These databases have been built over many years by private and public organizations. They represent a large investment of both time and money by the organization. They contain a great deal of information and are a valuable asset. One application for these two-dimensional databases is object recognition, and in particular, facial recognition.

Facial recognition is an important problem in computer vision, with applications to security, authentication, recognition, surveillance, multimedia, and other areas. Initially, a database (also known as a "gallery") of known persons is generated. Then a sampled image (also known as a "probe") is captured, for example, by a video camera. The image is then compared to the database to determine recognition (target-to-many matches) or authentication (target-to-one match). The need for a facial recognition system for security and other applications is taught by K. Bowyer, K. Chang, and P. Flynn in their paper "A survey of approaches and challenges in 3D and multi-modal 3D+2D face recognition" (Computer Vision and Understanding 101 [2006] 1-15).

The majority of the research and products for facial recognition involves the comparison of two-dimensional images. Two-dimensional comparison methods can use the large infrastructure of two-dimensional image databases currently available. These methods are well known and readily available.

Two-dimensional comparison methods also have many limitations, as is taught by Dionysian in U.S. Pat. No. 6,002,782. These limitations include the equipment and environment where the two-dimensional images are acquired. Differences in equipment produce different texture or type of images, for example between different still cameras, different video cameras, use of visible light, or infrared images. Differences in environment produce major differences in the images, for example lighting (time of day, brightness, lack of light, angle of available light) and the pose of the face.

It is commonly thought that because the shape of faces is not affected by obstacles, such as equipment or environment, three-dimensional comparisons have the potential to overcome many of the limitations of two-dimensional comparisons and have the potential for greater success. Three-dimensional models describe the shape of the object of interest. The model does not depend on the texture, type of image, lighting, or pose.

Practical implementations of fully three-dimensional recognition systems are inhibited by the fact that the existing reference databases are available only as two-dimensional images. Three-dimensional model databases do exist, but not to a large scale. They are not as well developed as existing two-dimensional image databases. Building a three-dimensional database is a large expense. Creating a three-dimensional model from scratch requires specialized equipment. Organizations would need to replace their current infrastructure of cameras and processors with new equipment. This equipment would also be a new expense for the organization. A larger obstacle to creating a three-dimensional model database from scratch is the need to re-sample all of the objects of interest. In the case of facial recognition, all of the people in the current image database would need to be re-sampled. While a company may be able to organize its employees to have their pictures re-taken, criminals and terrorists are less willing to sit for a law-enforcement organization or government organization to have their faces modeled.

Creating three-dimensional model databases from scratch is not an immediately feasible task. In many cases, the task may be prohibitive due to the expense or inability to re-sample all of the objects of interest. As a result, current work with three-dimensional models has primarily been directed towards using a three-dimensional probe model of a person of interest to produce a two-dimensional probe image. This two-dimensional probe image is compared to a two-dimensional database of known images.

There is therefore a need to provide a method and system to enable the use of the large infrastructure of existing two-dimensional facial databases for the purpose of three-dimensional facial recognition. There is an additional need for a method to enable comparisons of objects that is independent of the source used to derive the image of the object The current embodiment provides such a method and system.

SUMMARY

In accordance with one embodiment, a method for identifying an object based at least in part on a reference database including two-dimensional images of objects includes the following steps: (a) providing a three-dimensional model reference database containing a plurality of estimated three-dimensional models, wherein each estimated three-dimensional model is derived from a corresponding two-dimensional image from the two-dimensional reference database; (b) sampling at least one image of an object to be identified; (c) implementing at least one identification process to identify the object, the identification process employing data from the three-dimensional model reference database.

In one optional embodiment, providing said three-dimensional model reference database further comprises generating the three-dimensional model reference database by processing the two-dimensional images to generate the corresponding estimated three-dimensional model for each of the two-dimensional images. In another optional embodiment, the at least one sampled image is two-dimensional and further comprising processing the at least one sampled image to generate a corresponding estimated three-dimensional model of the object. In another optional embodiment, the at least one sampled image is a single two-dimensional image and further comprising processing the single two-dimensional image in conjunction with a three-dimensional generic model of the object of interest to generate a corresponding estimated three-dimensional model of the object In another optional embodiment, the at least one sampled image is a plurality of two-dimensional images of the object of interest, each of the plurality of two-dimensional images having been sampled with different angles and further comprising processing the plurality of two-dimensional images to generate a corresponding estimated three-dimensional model of the object. In another optional embodiment, the two-dimensional images from the reference database are color images and the at least one sampled image is an infrared image. In another optional embodiment, the at least one sampled image derives from a range sensing device, and further comprising processing the sampled image to generate a corresponding estimated three-dimensional model of the object. In another optional embodiment, the identification process employs data from the three-dimensional model reference database to create a constructed two-dimensional image to perform a two-dimensional to two-dimensional comparison.

In accordance with one embodiment, a method for identifying an object that is independent of the source used to derive the image of the object includes the following steps: (a) providing a two-dimensional reference image having a given texture content; (b) sampling at least one image of an object to be identified wherein the sampled image is not compatible with the given texture content of the two-dimensional reference image; (c) processing the two-dimensional reference image to generate a corresponding estimated three-dimensional reference model; (d) processing the sampled image to generate a corresponding estimated three-dimensional model of the object to be identified; and (e) implementing at least one identification process to identify the object, the identification process employing data from the estimated three-dimensional models.

In an optional embodiment, the reference image is a color image and the sampled image is an infrared image. In another optional embodiment, the sampling is performed using a range sensing device. In another optional embodiment, the reference image is provided from a database.

In accordance with one embodiment, a method for creating a three-dimensional facial model based at least in part on an image of part of a face includes the following steps: (a) providing a two-dimensional image of part of a face; (b) processing the two-dimensional image of part of a face to generate a three-dimensional image of the part of face; and (c) processing the three-dimensional image of the part of the face using symmetry to generate a full three-dimensional facial model.

In accordance with one embodiment, a system for identifying an object based at least in part on a two-dimensional reference database including two-dimensional images of a plurality of objects, the system includes: (a) a three-dimensional model reference database, containing a plurality of estimated three-dimensional models, wherein each estimated three-dimensional model is derived from a corresponding two-dimensional images from the two-dimensional reference database; (b) an image-sampling device configured for sampling at least one image of a real scene including the object of interest; and (c) a processing system, including at least one processor, operationally connected to said three-dimensional model reference database, and operationally connected to said image-sampling device, said processing system configured to implement at least one identification process to identify said object.

In accordance with one embodiment, a system for generating a three-dimensional model reference database by processing two-dimensional images to generate a corresponding estimated three-dimensional model for each of the two-dimensional images, the system includes: (a) a two-dimensional reference database including two-dimensional images of a plurality of objects; and (b) a processing system including at least one processor, operationally connected to the two-dimensional reference database, configured to: (i) process the two-dimensional images to generate the corresponding estimated three-dimensional model for each of the objects; and (ii) store data representative of the estimated three-dimensional models in the three-dimensional model reference database.

In one optional embodiment, the processing system is configured to process the at least one sampled image, wherein the at least one sampled image is two-dimensional, to generate a corresponding estimated three-dimensional model of the object. In one optional embodiment, the processing system is configured to process the at least one sampled image, wherein the at least one sampled image is two-dimensional, in conjunction with a three-dimensional reference model of the object of interest to generate a corresponding estimated three-dimensional model of the object. In one optional embodiment, the processing system is configured to process the at least one sampled image, wherein the at least one sampled image is plurality of two-dimensional images of the object of interest, each of the plurality of two-dimensional images having been sampled with different angles, and further comprising processing the plurality of two-dimensional images to generate a corresponding estimated three-dimensional model of the object. In one optional embodiment, the processing system is configured to process the at least one sampled image, wherein the at least one sampled image derives from an infrared image, in conjunction with at least one image from the reference database, wherein the at least one image from the reference database derives from a color image. In one optional embodiment, the processing system is configured to process the at least one sampled image, wherein the at least one sampled image derives from a range sensing device. In one optional embodiment, the processing system is configured to process data from the three-dimensional model reference database to create a constructed two-dimensional image, and wherein the at least one sampled image is two-dimensional, and further comprising processing the constructed two-dimensional image in conjunction with the sampled image to perform a two-dimensional to two-dimensional comparison.

In accordance with one embodiment, a system for identifying an object that is independent of the source used to derive the image of the object, the system comprising: (a) a two-dimensional reference image having a given texture content; (b) an image-sampling device configured for sampling at least one image of an object to be identified, wherein the texture content of the sampled image is not compatible with the given texture content of the two-dimensional reference image; and (c) a processing system including at least one processor, operationally connected to the image-sampling device configured to: (i) process the two-dimensional reference image to generate a corresponding estimated three-dimensional reference model; (ii) process the sampled image to generate a corresponding estimated three-dimensional model of the object to be identified; (iii) implement at least one identification process to identify the object, the identification process employing data from the estimated three-dimensional models.

In one optional embodiment, the reference image is a color image and the sampled image is an infrared image. In one optional embodiment, the processing system is configured to process the at least one sampled image, wherein the at least one sampled image derives from a range sensing device. In one optional embodiment, the reference image is provided from a database.

In accordance with one embodiment, a system for creating a three-dimensional facial model based at least in part on an image of part of a face, the system comprising: (a) a two-dimensional image of part of a face; (b) a processing system including at least one processor, configured to: (i) process the two-dimensional image of part of a face to generate a three-dimensional image of the part of face; and (ii) process the three-dimensional image of the part of face using symmetry to generate a full three-dimensional facial model.

DRAWINGS-BRIEF DESCRIPTION OF FIGURES

The embodiment is herein described, by way of example only, with reference to the accompanying drawings, wherein.

DETAILED DESCRIPTION

First Embodiment—FIGS. 1, 2A, 2B, 4, 5

The present invention is a method and system for using three-dimensional models to enable image comparisons independent of image source and/or to enhance the results of image comparison under a wide range of conditions. This solution enables the use of the large infrastructure of existing two-dimensional databases for increased success in recognition. This embodiment has several parts that support this solution.

The principles and operation of this method and system according to the present implementation may be better understood with reference to the drawings and the accompanying description.

Figure 1:
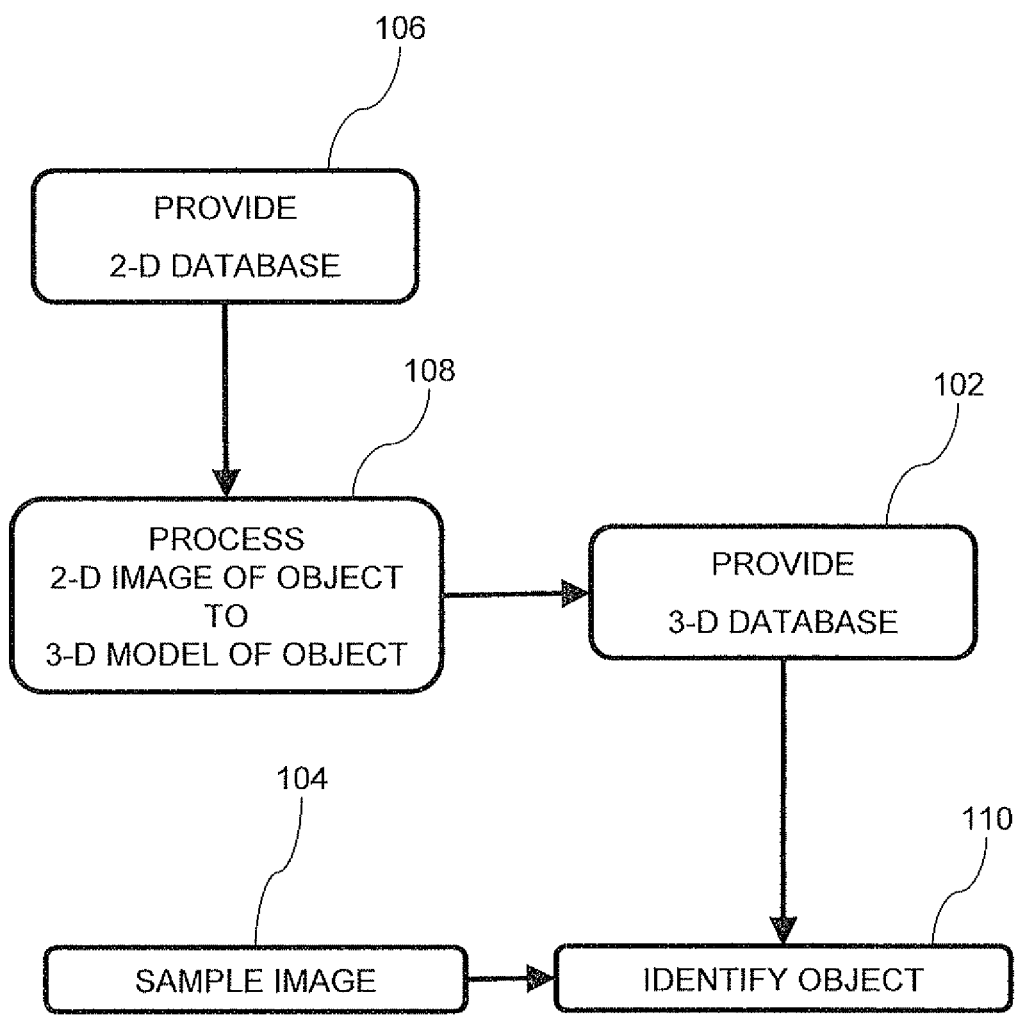
FIG. 1 shows a flowchart of a basic implementation method for identifying an object based on a three-dimensional database that derives from a two-dimensional database.

Referring now to the drawings, FIG. 1 shows a flowchart of a basic implementation of a method for identifying an object based on a three-dimensional database that derives from a two-dimensional database. In this context, a three-dimensional database refers to the information contained in the database, not the structure of the database. The information in the database is generally referred to as models, where the model contains sufficient parameters of interest to describe adequately the relevant portions of an object in three-dimensions. Similarly, in this context the term two-dimensional database refers to the information in the database. The two-dimensional information is generally referred to as an image. This method includes providing a two-dimensional database in block 106, processing images from the two-dimensional database in block 108, providing a three-dimensional database in block 102, sampling at least one image of an object in block 104, and identifying the object in block 110. This basic method encompasses a range of implementations including various optional embodiments, including additional sources of references images, alternative sources of reference images, additional sources of sampled images, alternative sources of sampled images, a range of implementations of image processing, and further processing. Where a first source exists and it is desirable to add a second source to the implementation, this second source is referred to as an additional source. An alternative source refers to an implementation where a first source exists, and it is desirable to replace the first source with a second source. Reference images are images that derive from known objects and sampled images refers to images of objects that are not known. An example of reference images is a database that a company generates with pictures of employees. An example of a sampled image is an image that is captured by a security camera. The method can include two-dimensional, three-dimensional, or partial images or models. While the various optional embodiments can generally be used individually, in alternative embodiments they can also generally be used together. This method can be used for identifying an object that is independent of the source used to derive the image of the object.

Providing a two-dimensional database is shown in block 106. As mentioned earlier, the two-dimensional database is typically an existing database of color images, such as facial photographs of people employed by a company, citizens of a country, or the like. According to conventional identification techniques, such a database would typically only be helpful for identification under controlled conditions where frontal color facial images can be sampled of the subject to be identified. In uncontrolled circumstances, or where the texture content of the sampled images are not compatible, such a two-dimensional database could not typically form a basis for reliable identification. According to one aspect of the present invention, the existing two-dimensional image database is processed at step 108 to generate a corresponding three-dimensional model database, which can then be used to facilitate object identification under a range of circumstances that would not otherwise have been possible.

Processing images from the two-dimensional database is shown in block 108. Processing the two-dimensional images from the two-dimensional database generates a corresponding estimated three-dimensional model for each of the two-dimensional images. The image processing 108 can include face detection and normalization. An example of a detection technique is finding the face of a person in an image of a real scene. Normalization techniques facilitate processing the relevant portions of the facial image. An example of the need for normalization is the sampled image being processed was acquired at a different distance than the image in the relevant application. The sampled image in this example is a different size than the images in the relevant application. Techniques for performing normalization are known in the industry and taught in the patent World Intellectual Property Organization, International Publication Number WO 2006/109291 A1, Face Normalization for Recognition and Enrollment. After image processing in block 108, the parameters of interest for the estimated three-dimensional models can then be provided to a three-dimensional database, shown in block 102. This processing can be repeated on a plurality of images, enabling the conversion of large two-dimensional databases to three-dimensional databases.

The three-dimensional database, shown in block 102, contains estimated three-dimensional models of objects. These models contain sufficient parameters of interest to describe adequately the relevant portions of the object in three-dimensions. Sampling an image of an object for which identification is desired is shown in block 104. This sampling results in a sampled image, also known as a probe. The sampled image contains relevant information for this object. The source of the sampled information is dependent on the type of equipment used. The step of sampling the image 104 can include many variations. Generally, the term image is used to refer to the sampled two-dimensional information for an object. Alternative embodiments will be described in reference to FIGS. 2A, 2B, and 3. The term image can also be used to refer to the sampled three-dimensional information for an object. An alternative embodiment will be described in reference to FIG. 4. Sampled images may require normalization.

Identifying the object is shown block 110. Identification involves the process of comparing information from the sampled image and information from the three-dimensional database. An alternative embodiment will be described in reference to FIG. 5.

An optional embodiment of this method uses additional identification techniques to provide increased success in identification. In this optional embodiment a comparison of the three-dimensional reference model with the three-dimensional sample model is performed, as described above. In addition, a comparison of the two-dimensional image of the reference object with the two-dimensional image of the sampled image is performed. The results of these two comparisons are used to provide increased success in identification. This technique is referred to as fusion. The details of this method are taught in World Intellectual Property Organization, International Publication Number WO 2006/111963 A2, Generic Classification System.

A possible embodiment comparing a three-dimensional model from a sample to a three-dimensional reference model from a database involves facial recognition. Generally, databases of facial images are created in controlled environments from full-frontal images. The person is stationary, the background is plain, and the sampling device has a view of the entire face of the person. Generally, identification of people takes place in uncontrolled environments. The person is in motion, the background is complex, and the sampling device does not have a view of the entire face of the person. The sampled image of the person of interest is generally not a frontal image. The sampled image will be at an uncontrolled angle, as compared to the reference image that is generally controlled to be a frontal image. The person of interest may also be partially obscured by an object between the sampling device and the person. Comparing the facial images from the two-dimensional reference database to the sampled image will generally not provide a successful identification. Using the method of FIG. 1, the person to be identified can be sampled. The sampled image may not be frontal. Processing this image can generate a three-dimensional model. This model can be rotated to provide a three-dimensional frontal view of the person to be identified. This three-dimensional frontal model can be compared to the three-dimensional model database.

It should be noted that each of the steps of generating the database, providing the database, processing using the database information, sampling the image, and identifying an object can be implemented by one or more entities. Entities in this context include computing devices, companies, or individuals. Each of these steps can be implemented by a different entity. Alternatively, two or more steps can be implemented by the same entity. The steps in this method can also be implemented at different times. An example of implementing the steps of this method at different times is an entity processing the two-dimensional database to generate a three-dimensional database. The three-dimensional database can be provided when needed to implement the identification steps of this method.

Figure 2A:
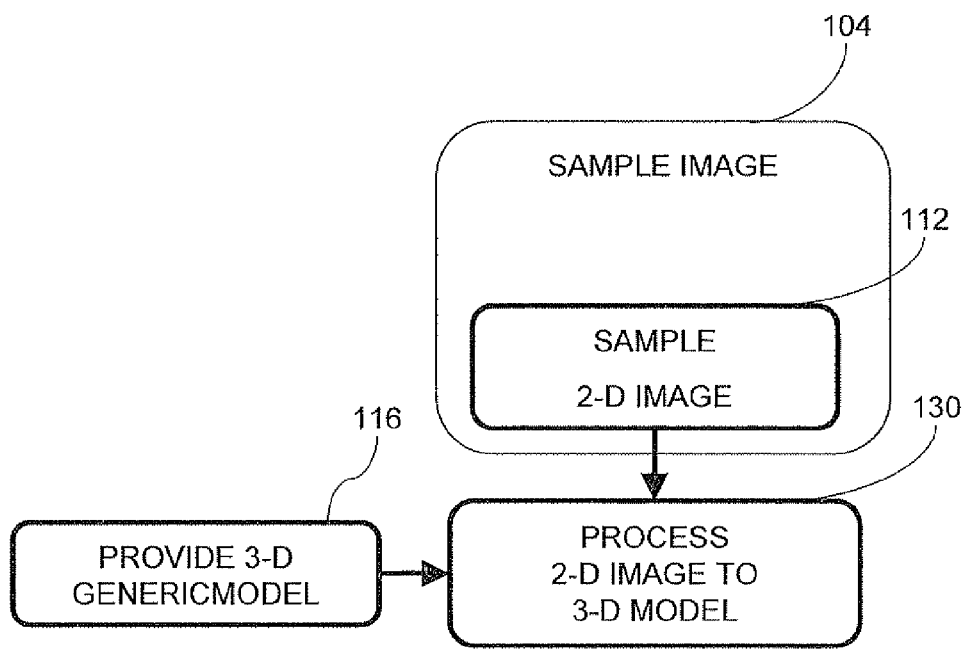
FIG. 2A shows a flowchart of an optional method for generating a three-dimensional model by processing a single two-dimensional image in conjunction with a three-dimensional generic model.

Referring to FIG. 2A, a flowchart of an optional method for generating a three-dimensional model by processing a single two-dimensional image in conjunction with a three-dimensional generic model. This is an optional method of the sample image block shown in FIG. 1 104. In this method, the sampling used is two-dimensional image sampling, block 112. Providing a three-dimensional generic model of the type of object of interest is shown in block 116. Processing, shown in block 130, uses a single two-dimensional sampled image in conjunction with the three-dimensional generic model of the type of object of interest, to generate a corresponding estimated three-dimensional model of the object of interest. This model can be used by the identification process 110. This technique is known to anyone ordinarily skilled in the art. An example of this technique with details supporting one implementation of this technique are discussed by Ira Kemelmacher and Ronen Basri in the paper *Molding Face Shapes by Example* published in ECCV 2006, Part I, LNCS 3951, pp. 277-288, 2006.

Figure 2B:
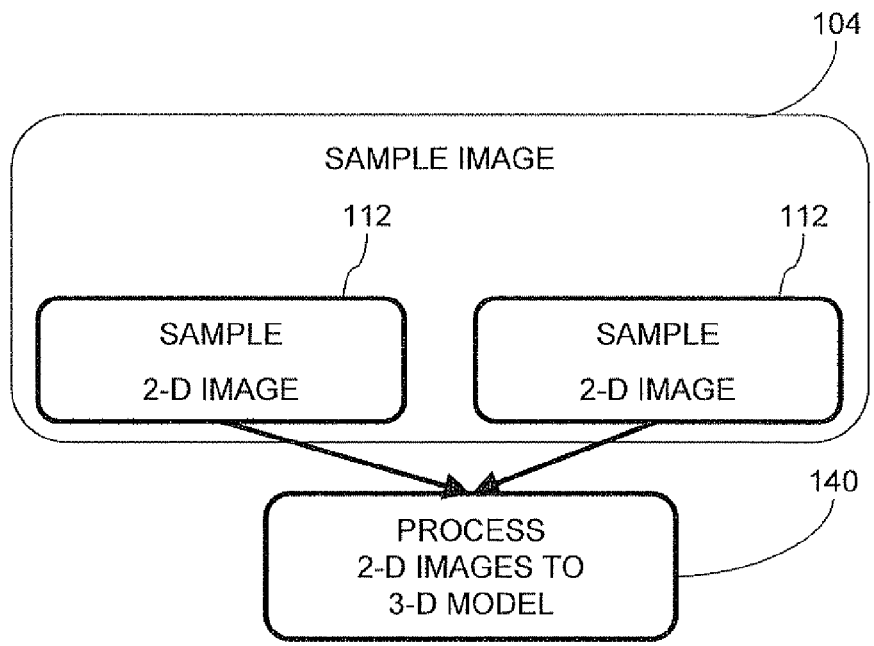
FIG. 2B shows a flowchart of an optional method for generating a three-dimensional model by processing a plurality of two-dimensional images.

Referring to FIG. 2B, a flowchart of an optional method for generating a three-dimensional model by processing a plurality of two-dimensional images. This is an optional method of the sample image block shown in FIG. 1 104. Sampling at least two images of an object of interest is shown in block 104. In this method, the sampling used is two-dimensional image sampling, blocks 112. The sampled images are sampled with different angles. An object in motion can be sampled by the same device, at different times. Due to the motion of the object, samples from the image-sampling device, sampled at different times, will provide images with views of the object from different angles. In another embodiment, the sampling can be done by different sampling devices at the same time. These embodiments result in multiple images of the object of interest, each image from a different angle. Processing, shown in block 140, uses at least two of these two-dimensional sampled images to generate a corresponding estimated three-dimensional model of the object of interest. This model can be used by the identification process. Implementation of this method using the techniques of structure from motion (SFM) is well known in the industry.

The method shown in FIG. 1 can be used in an alternative embodiment with an alternative source for the sampled images. Images are generated by sampling devices. Each type of sampling device generates an image with a texture content that is specific to that type of sampling device. One example is a color image-sampling device. This device produces images based on the visible light from the object of interest and sampled by the device. The image that is generated represents the visible color texture of the object. A second example is an infrared image-sampling device. This device produces images based on non-visible infrared electromagnetic energy from the object of interest that is sampled by the sampling device. The image that is generated represents the infrared texture of the object. Sampling devices based on other technologies will produce images with a texture content based on that technology. These texture contents are not compatible for comparing the original objects of interest.

In this alternative embodiment, a database 106 of two-dimensional color reference images is provided. Processing of these color images in block 108 generates estimated three-dimensional models of the objects. The sampled image 104 in this embodiment is a two-dimensional infrared image. Processing of this infrared image generates an estimated three-dimensional model of the sampled object. Identifying the object can then be done by comparing the models, as shown in block 110.

Figure 4:
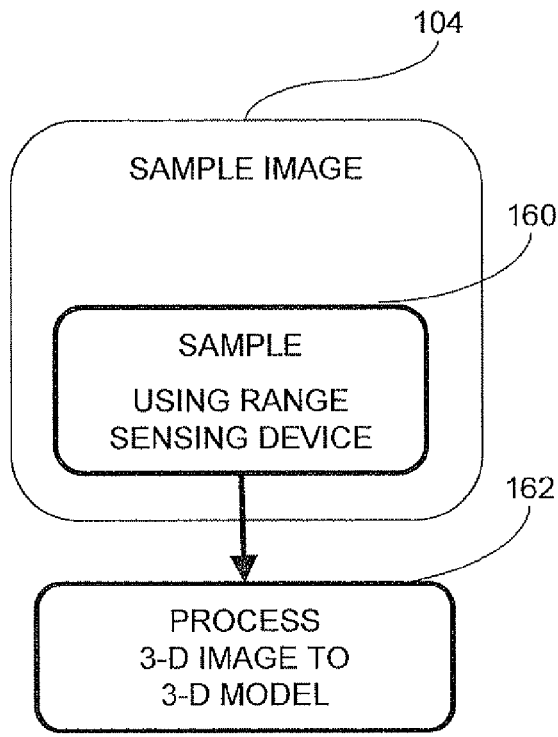
FIG. 4 shows a flowchart of an optional method for generating a three-dimensional model by processing an image derived from a range sensing device.

Referring to FIG. 4 shows a flowchart of an optional method for generating a three-dimensional model by processing an image derived from a range sensing device. In this context, a range sensing device is any sensor that produces sufficient information to describe an object of interest in three-dimensions. This is an optional method of the sample image block shown in FIG. 1 104. Generally, the term image is used to refer to the acquired two-dimensional information for an object. In this embodiment, the term image is used to refer to the sampled three-dimensional information for an object. The object is sampled in block 104 by a range sensing device 160. The range sensing device 160 produces a three-dimensional image. If the sampled three-dimensional image contains the relevant parameters of interest to describe the object, processing can use these parameters to generate the corresponding estimated three-dimensional model of the object. If the sampled three-dimensional image does not contain the relevant parameters, the image is processed to create the parameters of interest and then to use these parameters to generate the corresponding estimated three-dimensional model of the object. In the example of facial recognition, normalization of the sampled image may be necessary. When sampling a real scene, both a two-dimensional image and a three-dimensional image can be acquired. Known techniques can be used on the two-dimensional image to identify the area in the two-dimensional image containing a face. This area information can then be used by further processing stages to identify where the face is in the three-dimensional image.

Figure 5:
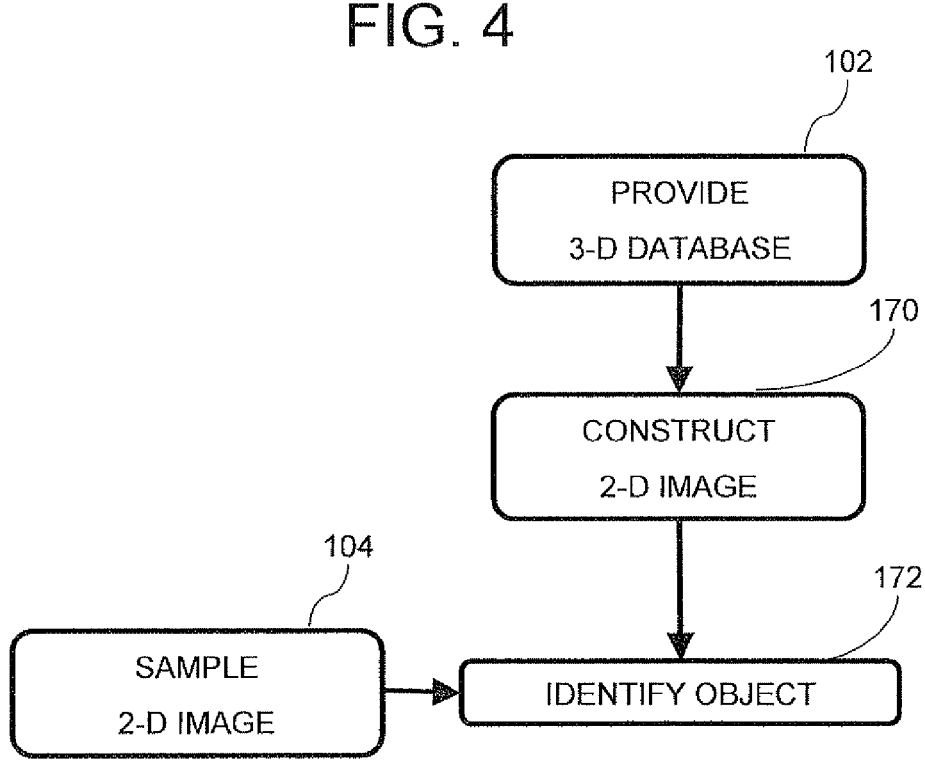
FIG. 5 shows a flowchart of an optional method for identifying an object based on a two-dimensional image that has been constructed from a three-dimensional model.

Referring to FIG. 5 shows a flowchart of an optional method for identifying an object based on a two-dimensional image that has been constructed from a three-dimensional model. This is an optional method of FIG. 1. In this embodiment, the object of interest is sampled in block 104. Processing the two-dimensional sampled image is not necessary to produce a three-dimensional model. Processing of the two-dimensional sampled image may be necessary to produce a two-dimensional probe with the parameters of interest to describe adequately the relevant portions of the object. Providing a three-dimensional model is shown in block 102. A three-dimensional model is used to construct a two-dimensional image in block 170. This construction generates parameters of interest that enable comparison with the sampled image. When identifying the object, block 172, the two-dimensional sampled image can then be compared to the constructed two-dimensional reference image.

An example of comparing a two-dimensional sampled image to a two-dimensional reference image involves facial recognition. A person to be identified can be sampled. In this embodiment, the sampled image is not necessarily a frontal image, but may be at an uncontrolled angle. The sampled image is processed to produce a two-dimensional sampled image with the parameters of interest to describe adequately the relevant portions of the object. The desired plurality of models from the three-dimensional database can be rotated to match the angle of the sampled image. The rotated three-dimensional model is used to generate a constructed two-dimensional reference image. The constructed image is generated to be compatible with the parameters of interest of the sampled image. These parameters include the angle at which the object of interest was captured, normalization to the size desired, and texture content. The two-dimensional sampled image is compared to the constructed two-dimensional reference image.

OPERATIONAL DESCRIPTION

Figure 6:
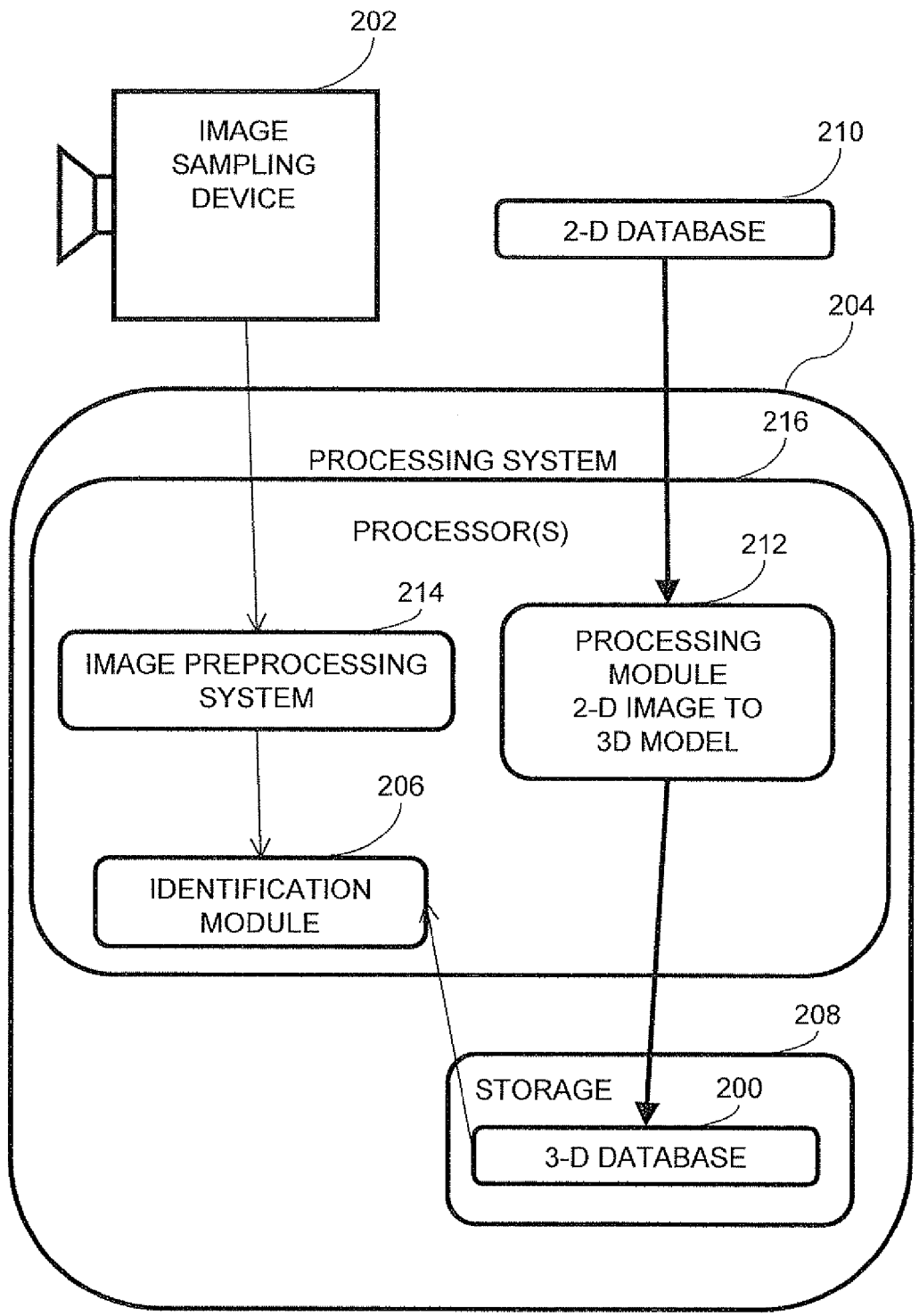
FIG. 6 shows a diagram of a system for generating a three-dimensional database from a two-dimensional database.

First Embodiment—FIG. 6

Referring to FIG. 6 shows a diagram of a system for generating a three-dimensional database from a two-dimensional database. This system can be used to implement the method of FIG. 1 and the optional methods shown in FIG. 2A, 2B, 3, 4, and 5. This system includes an image-sampling device 202, a processing system 204, and a two-dimensional database 210.

The processing system 204 contains one or more processors 216, and storage 208. The one or more processors 216 are configured to run an image preprocessing system 214, processing to convert two-dimensional image to a three-dimensional model 212, and an identification module 206. Storage 208 can be used to store a three-dimensional database 200.

The two-dimensional database 210 including two-dimensional images of a plurality of objects is operationally connected to a processing system 204. The processing system 204 is configured 212 to process two-dimensional images from the two-dimensional database 210 to generate a corresponding estimated three-dimensional model for each object. The parameters of interest for the estimated three-dimensional models can then be sent for storage 208 to a three-dimensional database 200. This processing can be repeated on a plurality of images, enabling the conversion of large two-dimensional databases to three-dimensional databases.

The three-dimensional database 200 is operationally connected to the processing system 204. This database contains estimated three-dimensional models of objects. These models contain sufficient parameters of interest to describe adequately the relevant portions of the object in three-dimensions.

An image-sampling device 202 is operationally connected to the processing system 204. The image-sampling device 202 samples an image of an object for which identification is desired. This sampling results in a sampled image, also known as a probe. The sampled image contains relevant information for this object. The source of the sampled information is dependent on the type of equipment used. Image sampling can be done by a range of devices including color cameras, infrared cameras, and range sensing devices such as Light Detection and Ranging (LIDAR). It should be noted that in the embodiments described, the source of the images might vary. Anyone ordinarily skilled in the art will understand that where an embodiment describes a specific type of image, a different type of image can be used. The same method can be used, with a different system implementation of image specific processing.

Images from the image-sampling device 202 can be sent to the image preprocessing system 214. The image preprocessing system 214 facilitates normalization of the acquired image and any other processing necessary to convert the sampled image and generate the desired model to be used by the identification module 206. The processing system 204 contains one or more processors 216 that are configured with an identification module 206. The identification module compares information from the sampled image and information from the three-dimensional database.

It should be noted that the components of this system could vary in their implementation location. Each of these components can also vary in the entity that provides the component. In one embodiment, all of the components are provided by the same entity and are implemented on the same processing system. In another embodiment, each of the databases is implemented by a separate entity, and the processing is implemented by a separate entity. Entities in this context include computing devices, companies, or individuals. An example of implementation by a plurality of entities is the three-dimensional database 200 and processing system 204 residing at a central government facility and the image sampling 202, image preprocessing 214, and identification module 206 are implemented at a private company.

Note that if a component is available, it may not be necessary to use the entire system to provide it. An example of a component that could be available is the three-dimensional database. If an entity, such as a government organization, creates a three-dimensional database, it is available for other entities, such as private companies, to use to perform identification.

Further embodiments are obvious to one ordinarily skilled in the art. In FIG. 6, the database is shown as residing on the processing system. The exact location of the implementation of the database is dependent on the customer's requirements for the operation of the system. It is apparent to one normally skilled in the art that the database can be located in a variety of locations to support the method of this system. One example is to implement the database on the processing system 204. Another example is to access remotely a database owned by another entity by using a network connection. Similarly, the processing in this system can be implemented in a variety of locations. In the embodiment of FIG. 6, the processing is implemented on one central processing system. Depending on the customer requirements for the system, it may be preferable to implement the image processing on the image-sampling device. In one embodiment, it may be preferable to have inexpensive cameras, or desirable to maintain software only on a central device. This embodiment implements the processing on a single, central processing system. In another embodiment, it may be preferable to limit the amount of processing done by a central processing system, increase the throughput of the identification process, or distribute functionality for increased reliability. This embodiment implements the processing on the image-sampling devices. It is obvious to one ordinarily skilled in the art that processing can occur in a variety of locations.

An embodiment for this system is the field of face recognition. Refer to FIG. 6 where sampling the image 202 includes sampling a scene with the person of interest. The sampled image is preprocessed 214 to locate a face in the image. The sampled facial image is further processed 214 to produce an estimated three-dimensional model. The estimated three-dimensional model is sent to the identification module 205 that accesses the three-dimensional database 200 for three-dimensional models and uses these three-dimensional models to perform a comparison.

The system diagram shown in FIG. 6 can be used as the basis of a range of implementations. The following descriptions describe several alternative implementations of the system.

Referring to FIG. 2A and FIG. 6, one alternative implementation of the system generates a three-dimensional model by processing a single two-dimensional image in conjunction with a three-dimensional generic model. An image-sampling device 202 samples 104 a single image of an object of interest as a two-dimensional image 112. The two-dimensional image is sent to the processing system 204 for image preprocessing 214. A three-dimensional generic model of the type of object of interest is also provided 116 to the image preprocessing system 214. The image preprocessing system 214 is configured to process the single two-dimensional sampled image in conjunction with the three-dimensional generic model of the type of object of interest to generate a corresponding estimated three-dimensional model of the object of interest. This model can be used by the identification module 206 to identify the object of interest.

Referring to FIG. 2B and FIG. 6, one alternative implementation of the system generates a three-dimensional model by processing a plurality of two-dimensional images. An image-sampling device 202 samples 104 at least two images of an object of interest. In this method, the sampling used is two-dimensional image sampling, shown in blocks 112. The images are sent to a processing system 204 where at least one processor 216 is configured with an image preprocessing system 214. The image preprocessing system uses at least two of these two-dimensional sampled images to generate a corresponding estimated three-dimensional model of the object of interest. This three-dimensional model can be used by the identification module 206 to identify the object of interest. A range of techniques can be implemented in the image preprocessing system 214. An example of an optional technique is to use optical flow-based super resolution to process a plurality of two-dimensional images to generate a higher resolution two-dimensional image that can be further processed by the system.

Referring to FIG. 6, a variety of components is stored on the storage device. Stored components include the three-dimensional generic model 116 of FIG. 2A, the two-dimensional database 106 of FIG. 1, the three-dimensional database 200 of FIG. 6. If the sampled images and models need to be stored, the sampled images and models can be stored on the storage device. It is apparent to one normally skilled in the art that the storage 200 can be used by various components, including, but not limited to components that are provided by another entity.

Referring to FIG. 6, an alternative implementation of this system uses a different type of image as the source for the two-dimensional database 210 and the acquired image 202. In this alternative embodiment, the images for the two-dimensional database 210 are color images. The two-dimensional database of color images 210 is operationally connected to the processing system 204 where at least one processor 216 is configured to process the two-dimensional color image and generate a corresponding estimated three-dimensional model. The image-sampling device 202 is an infrared device. The image-sampling device 202 is operationally connected to the processing system 204 where at least one processor 216 is configured with an image preprocessing system 214 to process the infrared image and generate a corresponding estimated three-dimensional model of the object of interest. The three-dimensional models can be used by the identification module 206 to identify the object of interest.

Referring to FIG. 6, an alternative embodiment of this system generates a three-dimensional model by processing an image derived from a range sensing device. In this embodiment, the image-sampling device 202 is a range sensing device. The range sensing device produces a three-dimensional image. The image-sampling device 202 is operationally connected to the processing system 204 where at least one processor 216 is configured with an image preprocessing system 214 to process the three-dimensional image. If the sampled three-dimensional image contains the relevant parameters of interest to describe the object, the image preprocessing system 214 can use these parameters to generate the corresponding estimated three-dimensional model of the object. If the sampled three-dimensional image does not contain the relevant parameters, the image is processed by the image preprocessing system 214 to create the parameters of interest, and then to use these parameters to generate the corresponding estimated three-dimensional model of the object. This three-dimensional model can be used by the identification module 206 to identify the object of interest.

Figure 9:
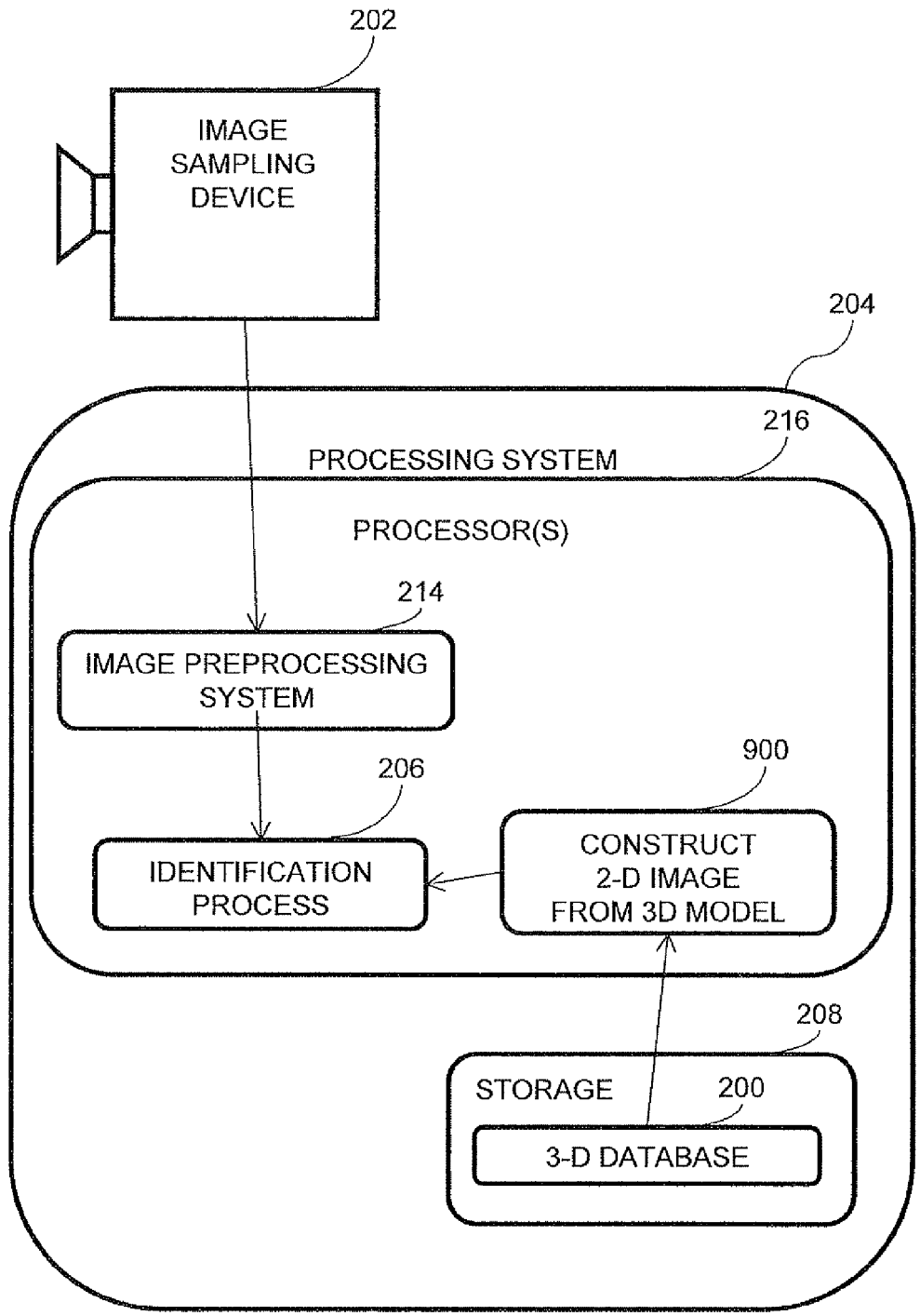
FIG. 9 shows a diagram of an alternative embodiment of the system that identifies an object based on a two-dimensional image that has been constructed from a three-dimensional model.

Referring to FIG. 9 and FIG. 5, an alternative embodiment of this system identifies an object based on a two-dimensional image that has been constructed from a three-dimensional model. This is an optional system of FIG. 6. In this embodiment, the object of interest is sampled 104 by an image-sampling device 202. The sampled image is two-dimensional. The image-sampling device 202 is operationally connected to the processing system 204. In this embodiment the image preprocessing system 214, is not necessary to produce a three-dimensional model. Image preprocessing of the two-dimensional sampled image may be necessary to produce a two-dimensional probe with the parameters of interest to describe adequately the relevant portions of the object.

A three-dimensional database 200 provides a three-dimensional model. The three-dimensional database is operationally connected to the processing system 204 where at least one processor 216 is configured to process the three-dimensional model and generate a corresponding two-dimensional image 900. The two-dimensional images can be used by the identification module 206 to identify the object of interest.

Referring again to FIG. 9, this system can have an additional optional embodiment. In this additional option, the reference image is the previously described two-dimensional image that has been constructed 900 from a corresponding three-dimensional model. The additional option is implemented in the image preprocessing system 214. An object of interest is sampled by an image-sampling device 202. The two-dimensional sampled image is processed by the image preprocessing system 214, to generate a three-dimensional model of the object of interest. The three-dimensional model of the object of interest is further processed to facilitate comparison with the constructed two-dimensional image. An example of further processing is rotating the generated three-dimensional model so the viewing angle of the rotated model is compatible with the viewing angle of the constructed two-dimensional image. The generated three-dimensional model is further processed to generate a two-dimensional image of the object of interest. This generated two-dimensional image can be used with the constructed two-dimensional image by the identification module 206 to identify the object of interest.

Referring again to FIG. 9, this system can have an additional optional embodiment. In this additional option, an alternative source is used for the sampled image. The reference image is the previously described two-dimensional image that has been constructed 900 from a corresponding three-dimensional model. The additional option is implemented in the image-sampling device 202. In this embodiment, the image sampling device FIG. 9 202 is replaced by a range sensing device such as shown in FIG. 8B 430. An object of interest is sampled by the range sensing device. The range sensing device produces a three-dimensional image of the object of interest. The image preprocessing system 214 is configured to process the sampled three-dimensional image to generate a corresponding estimated three-dimensional model of the object of interest. The three-dimensional model is further processed to generate a two-dimensional image of the object of interest. This generated two-dimensional image can be used with the constructed two-dimensional image by the identification module 206 to identify the object of interest.

DETAILED DESCRIPTION

Alternative Embodiment—FIG. 7A, 7B, 8A, 8B

Figure 7A:
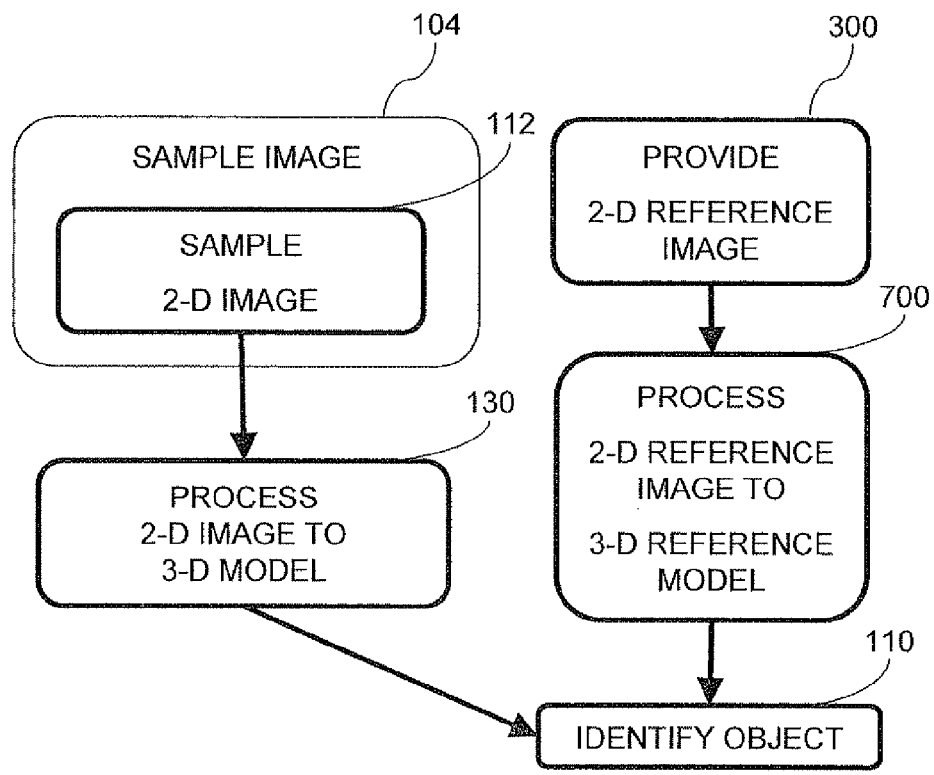
FIG. 7A shows a flowchart of a method for identifying an object that is independent of the source used to derive the image of the object.

Referring to FIG. 7A shows a flowchart of a method for identifying an object that is independent of the source used to derive the image of the object. This is an alternative embodiment of the method shown in FIG. 1. As described above, images are generated by sampling devices. Each type of sampling device generates an image with a texture content that is specific to that type of sampling device. These texture contents are not compatible for comparing the original objects of interest. In the given examples of a color image and an infrared image, the two images cannot be directly compared.

In the method described in this embodiment, the two-dimensional images each have different texture content. The sampled image is processed from its two-dimensional texture content to create a three-dimensional model. The reference image is also processed from its two-dimensional texture content to create a three-dimensional model. The resulting three-dimensional models are independent of the original incompatible texture contents. This method thus enables comparison of objects where the equipment used to sample the objects generates texture contents that are not compatible.

Referring to FIG. 7A, the method includes providing a two-dimensional reference image in block 300, processing the reference image in block 700, sampling an image in block 104, processing the sampled image in block 130, and identifying the object in block 110.

Providing a two-dimensional reference image having a given texture content is shown in block 300. The two-dimensional reference image is processed in block 700 to generate a corresponding estimated three-dimensional reference model. Sampling at least one image of an object to be identified, where the texture content of the sampled image is not compatible with the texture content of the reference image is shown in block 104. In this method, the sampling used is two-dimensional image sampling, block 112. An alternative embodiment will be described in reference to FIG. 7B. Processing the sampled image to generate a corresponding estimated three-dimensional model of the object to be identified is shown in block 130. These generated three-dimensional reference models are used to compare the object of interest to a reference of the object. Implementing at least one identification module to identify the object is shown in block 110. Details supporting implementation of this technique are discussed in the paper by K. Bowyer, et. al.

Figure 7B:
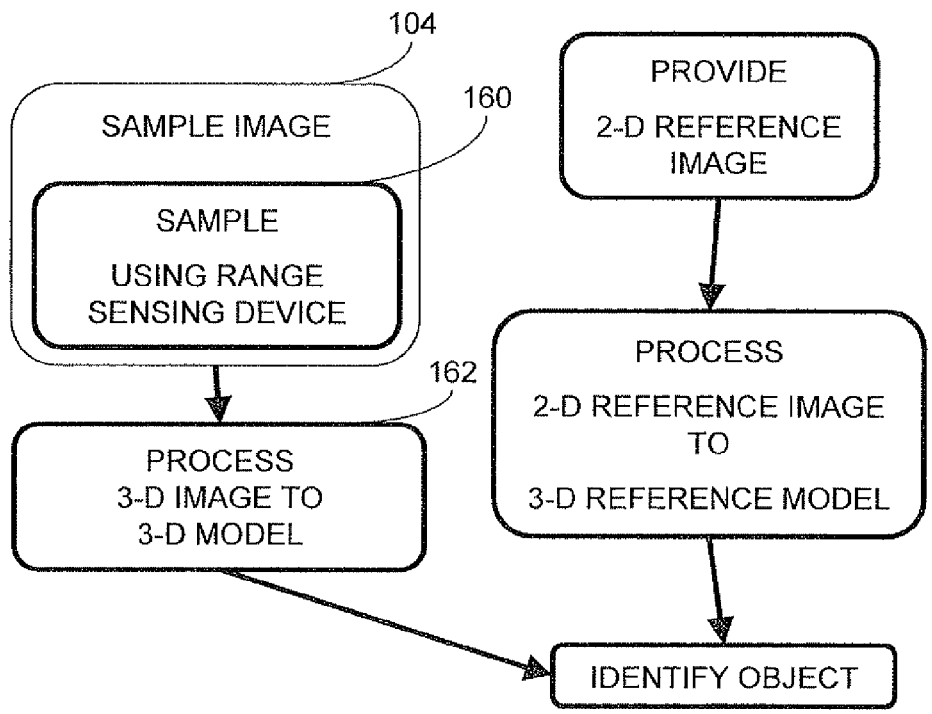
FIG. 7B shows a flowchart of a method for identifying an object that is independent of the source used to derive the image of the object, where the sampling is performed using a range sensing device.

Referring to FIG. 7B shows a flowchart of a method for identifying an object that is independent of the source used to derive the image of the object, where the sampling is performed using a range sensing device. This is an alternative embodiment of the method shown in FIG. 1 and described in reference to FIG. 7A. This method includes sampling an image in block 104, and processing the sampled image in block 162. The object is sampled in block 104 by a range sensing device 160. The range sensing device 160 produces a three-dimensional image. Processing the three-dimensional sampled image to generate a corresponding estimated three-dimensional model of the object to be identified is shown in block 162. This estimated three-dimensional model can be used by the identification module to identify the object of interest.

It can be seen from the descriptions of FIGS. 7A and 7B that by using these methods, images with a variety of texture contents that would otherwise be incompatible can be compared. The source of the image is dependent on the type of image capture device used. Image capture devices include color cameras, infrared cameras, and range sensing devices such as Light Detection and Ranging (LIDAR). It should be noted that in the embodiments described, anyone ordinarily skilled in the art would understand that where an embodiment describes a specific type of image, a different type of image could generally be used. The same method can be used, with a different system implementation of image specific processing. This provides a method for identifying an object that is independent of the source used to derive the image of the object.

Figure 8A:
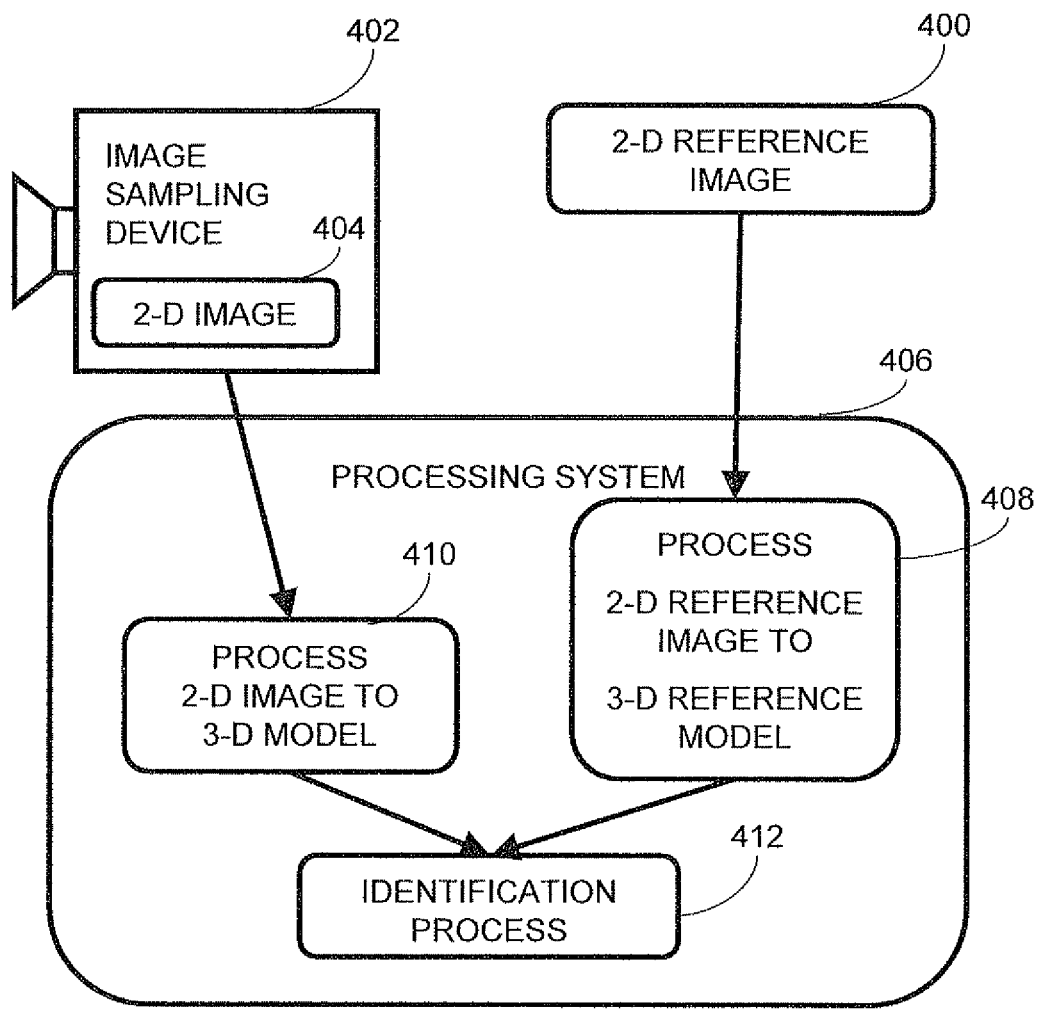
FIG. 8A shows a diagram of a system for identifying an object that is independent of the source used to derive the image of the object.
Figure 8B:
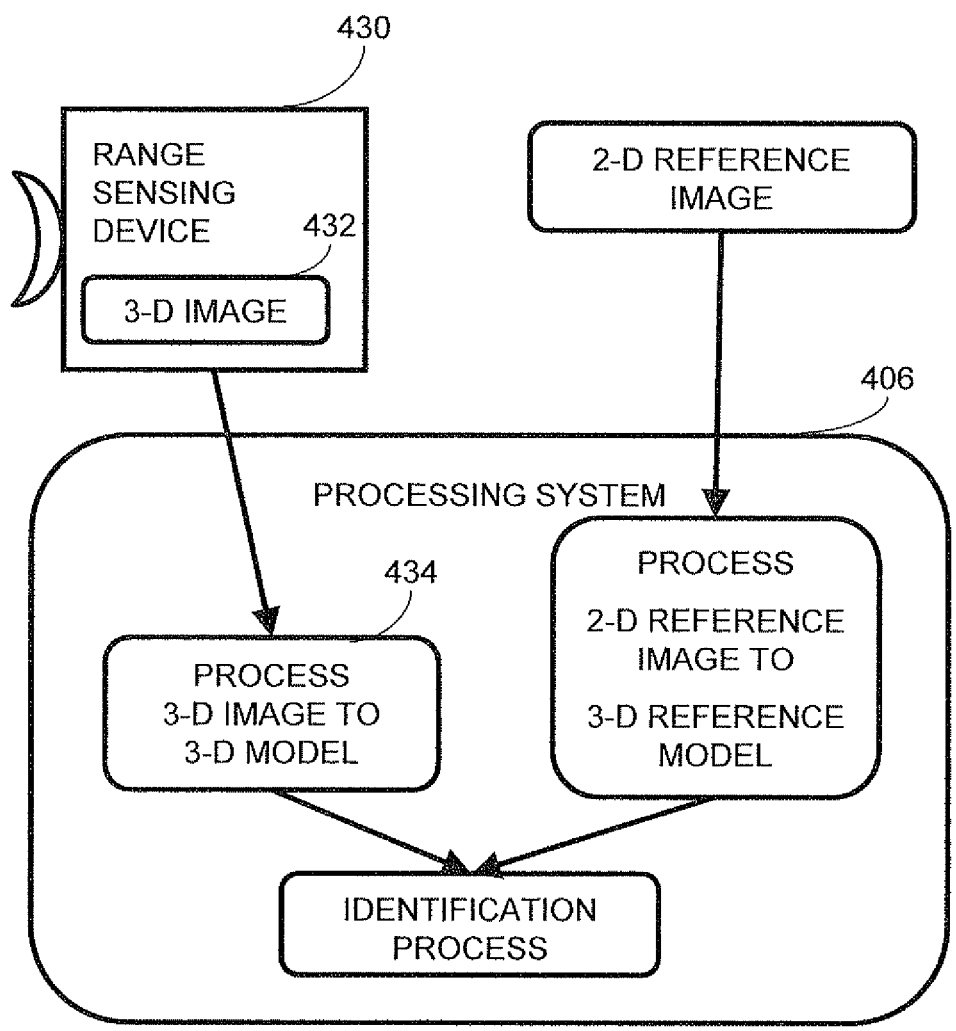
FIG. 8B shows a diagram of a system for identifying an object that is independent of the source used to derive the image of the object, where the sampling is performed using a range sensing device.

Referring to FIG. 8A shows a diagram of a system for identifying an object that is independent of the source used to derive the image of the object. This system includes a two-dimensional reference image 400, an image-sampling device 402, and a processing system 406. The two-dimensional reference image with a given texture content 400 is provided to the processing system 406 which is configured to process 408 the reference image to generate a corresponding estimated three-dimensional reference model. An image-sampling device 402 is configured for sampling at least one two-dimensional image 404 of an object to be identified. In this embodiment, the texture content of the sampled image 404 is not compatible with the texture content of the two-dimensional reference image 400. The image-sampling device 402 is operationally connected to the processing system 406. The processing system 406 is configured to process 410 the sampled image to generate a corresponding estimated three-dimensional model of the object to be identified. An identification module 412 employs data from the three-dimensional models to perform a comparison and identify the object of interest.

FIG. 8B shows a diagram of a system for identifying an object that is independent of the source used to derive the image of the object, where the sampling is performed using a range sensing device. This is an alternative embodiment of the method shown in FIG. 7A and described in reference to FIG. 8A. This system includes a range sensing device 430, and a processing system 406. A range sensing device 430 is configured for sampling at least one three-dimensional image 432 of an object to be identified. The range sensing device 430 is operationally connected to the processing system 406. The processing system 406 is configured to process 434 the sampled three-dimensional image to generate a corresponding estimated three-dimensional model of the object to be identified. This three-dimensional model is used by the system to facilitate identification of the object of interest.

The systems described in FIGS. 8A and 8B can encompass a range of implementations including various optional embodiments, including alternative sources images. The systems can be used to process a variety of images, including two-dimensional, three-dimensional, or partial images or models. The systems can process images from a variety of sources including color cameras, infrared cameras, range sensing devices such as Light Detection and Ranging (LIDAR), databases, internal components, and when provided by external entities. It should be noted that in the embodiments described, anyone ordinarily skilled in the art would understand that where an embodiment describes a specific type of image, a different type of image could generally be used.

DETAILED DESCRIPTION

Figure 3:
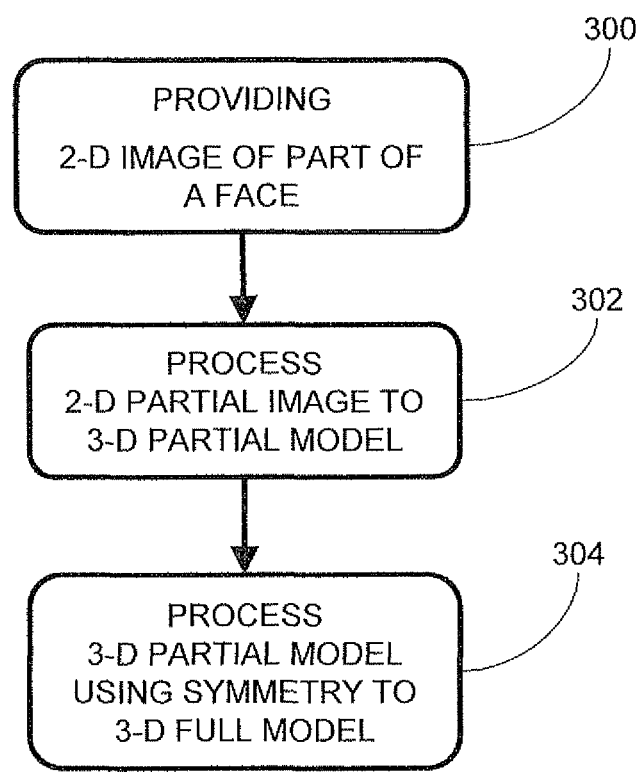
FIG. 3 shows a flowchart of a method for creating a three-dimensional facial model based at least in part on an image of part of a face.

Enhancement to the Embodiments—FIG. 3

Referring to the drawings, FIG. 3 shows a flowchart of a method for creating a three-dimensional facial model based at least in part on an image of part of a face. This enhancement can be used to advantage in a range of contexts including, but not limited to, the various embodiments described above. In this method, only a portion of the relevant part of the face of the person is visible to the sampling device. This may be due to sampling the person from a non-frontal angle, an object between the sampling device and the person, or other environmental obstacles. This is referred to with the term part of a face. This is also referred to in the figures as a two-dimensional partial image. Note that the acquired image data is intact. There is no missing data from the sampled image of the person of interest, rather the image is missing information about the full face of the person.

The method includes: providing a two-dimensional image of part of a face, block 300, processing the two-dimensional image of part of a face to generate a three-dimensional image of part of the face, block 302, and processing the three-dimensional image of part of the face using symmetry to generate a full three-dimensional facial model, block 304.

Providing a two-dimensional image of part of a face is shown in block 300. This two-dimensional partial image is processed in block 302 to generate a three-dimensional model of part of the face. This three-dimensional model of part of the face is similar to the two-dimensional partial image in that it only models a portion of the relevant part of the face. This is referred to in the figures as a three-dimensional partial model. The model is intact, there is no missing data from the three-dimensional partial model, rather the image is missing information about the full face of the person. In one embodiment, this processing includes using the technique of structure from motion to generate the three-dimensional partial model. In other embodiments, alternative methods of normalization may be used.

Processing the three-dimensional partial model, shown in block 304, uses central planar symmetry to generate a three-dimensional model of the entire face. This is referred to in the drawings as a three-dimensional full model. This method enables the creation of a full three-dimensional model despite the well-known environmental limitation of acquiring an image of part of the face. This model can be provided to other processes for storage or use.

The method of FIG. 3 can be implemented in the system diagram shown in FIG. 6, as an optional additional function to the image preprocessing system 214.

It should be noted that the components of this system could vary in their implementation location. Each of these components can also vary in the entity that provides the component. In one embodiment, all of the components are provided by the same entity and are implemented on the same processing system. In another embodiment, each of the components is implemented by separate entities. Further embodiments are obvious to one ordinarily skilled in the art.

CONCLUSION, RAMIFICATIONS, AND SCOPE

It will be appreciated that the above descriptions are intended only to serve as examples, and that many other embodiments are possible within the scope of the present invention as defined in the appended claims.

What is claimed is:

1. A method for identifying an object based at least in part on a two-dimensional (2D) reference database including two-dimensional images of a plurality of objects, the method comprising:
   (a) providing a three-dimensional (3D) model reference database containing a plurality of estimated three-dimensional models, wherein each estimated three-dimensional model is derived from a corresponding two-dimensional image from the two-dimensional reference database;
   (b) sampling at least one image of an object to be identified; and
   (c) implementing at least one identification process to identify said object, said identification process employing data from said three-dimensional model reference database.

2. The method of claim 1, wherein providing said three-dimensional model reference database further comprises generating said three-dimensional model reference database by processing the two-dimensional images to generate said corresponding estimated three-dimensional model for each of the two-dimensional images.

3. The method of claim 1, wherein said at least one sampled image is two-dimensional and further comprising processing said at least one sampled image to generate a corresponding estimated three-dimensional model of said object.

4. The method of claim 3 wherein said identification process includes comparison of said corresponding estimated 3D model of said object to said plurality of estimated 3D models.

5. The method of claim 1 wherein said at least one sampled image is a single two-dimensional image and further comprising processing said single two-dimensional image in conjunction with a three-dimensional generic model of the object of interest to generate a corresponding estimated three-dimensional model of said object.

6. The method of claim 1, wherein said at least one sampled image is a plurality of two-dimensional images of the object of interest, each of said plurality of two-dimensional images having been sampled with different angles and further comprising processing said plurality of two-dimensional images to generate a corresponding estimated three-dimensional model of said object.

7. The method of claim 1, wherein said two-dimensional images from the reference database are color images and said at least one sampled image is an infrared image.

8. The method of claim 1, wherein said at least one sampled image derives from a range sensing device, and further comprising processing said sampled image to generate a corresponding estimated three-dimensional model of said object.

9. The method of claim 1, wherein the identification process employs data from said three-dimensional model reference database to create a constructed two-dimensional image to perform a two-dimensional to two-dimensional comparison.

10. A method for identifying an object that is independent of the source used to derive the image of said object, the method comprising:
   (a) providing a two-dimensional reference image having a given texture content;
   (b) sampling at least one image of an object to be identified wherein the sampled image is not compatible with the given texture content of said two-dimensional reference image;
   (c) processing said two-dimensional reference image to generate a corresponding estimated three-dimensional reference model;
   (d) processing said sampled image to generate a corresponding estimated three-dimensional model of the object to be identified; and
   (e) implementing at least one identification process to identify said object, said identification process employing data from said estimated three-dimensional models.

11. The method of claim 10, wherein said reference image is a color image and said sampled image is an infrared image.

12. The method of claim 10, wherein said sampling is performed using a range sensing device.

13. The method of claim 10, wherein said reference image is provided from a database.

14. A method for creating a three-dimensional facial model based at least in part on an image of part of a face, the method comprising:
   (a) providing a two-dimensional image of part of a face;
   (b) processing said two-dimensional image of part of a face to generate a three-dimensional image of said part of face; and
   (c) processing said three-dimensional image of said part of said face using symmetry to generate a full three-dimensional facial model.

15. A system for identifying an object based at least in part on a two-dimensional reference database including two-dimensional images of a plurality of objects, the system comprising:
   (a) a three-dimensional model reference database, containing a plurality of estimated three-dimensional models, wherein each estimated three-dimensional model is derived from a corresponding two-dimensional images from the two-dimensional reference database;
   (b) an image-sampling device configured for sampling at least one image of a real scene including the object of interest; and
   (c) a processing system, including at least one processor, operationally connected to said three-dimensional model reference database, and operationally connected to said image-sampling device, said processing system configured to implement at least one identification process to identify said object.

16. The system of claim 15, wherein said processing system is configured to process said at least one sampled image, wherein said at least one sampled image is two-dimensional, to generate a corresponding estimated three-dimensional model of said object.

17. The system of claim 15, wherein said processing system is configured to process said at least one sampled image, wherein said at least one sampled image is two-dimensional, in conjunction with a three-dimensional reference model of the object of interest to generate a corresponding estimated three-dimensional model of said object.

18. The system of claim 15, wherein said processing system is configured to process said at least one sampled image, wherein said at least one sampled image is plurality of two-dimensional images of the object of interest, each of said plurality of two-dimensional images having been sampled with different angles, and further comprising processing said plurality of two-dimensional images to generate a corresponding estimated three-dimensional model of said object.

19. The system of claim 15, wherein said processing system is configured to process said at least one sampled image, wherein said at least one sampled image derives from an infrared image, in conjunction with at least one image from said reference database, wherein said at least one image from said reference database derives from a color image.

20. The system of claim 15, wherein said processing system is configured to process said at least one sampled image, wherein said at least one sampled image derives from a range sensing device.

21. The system of claim 15, wherein said processing system is configured to process data from said three-dimensional model reference database to create a constructed two-dimensional image, and wherein said at least one sampled image is two-dimensional, and further comprising processing said constructed two-dimensional image in conjunction with said sampled image to perform a two-dimensional to two-dimensional comparison.

22. A system for generating a three-dimensional model reference database by processing two-dimensional images to generate a corresponding estimated three-dimensional model for each of the two-dimensional images, the system comprising:
  (a) a two-dimensional reference database including two-dimensional images of a plurality of objects; and
  (b) a processing system including at least one processor, operationally connected to said two-dimensional reference database, configured to:
    (i) process said two-dimensional images to generate said corresponding estimated three-dimensional model for each of said objects; and
    (ii) store data representative of said estimated three-dimensional models in said three-dimensional model reference database.

23. A system for identifying an object that is independent of the source used to derive the image of said object, the system comprising:
  (a) a two-dimensional reference image having a given texture content;
  (b) an image-sampling device configured for sampling at least one image of an object to be identified, wherein the texture content of the sampled image is not compatible with the given texture content of said two-dimensional reference image; and
  (c) a processing system including at least one processor, operationally connected to said image-sampling device configured to:
    (i) process said two-dimensional reference image to generate a corresponding estimated three-dimensional reference model;
    (ii) process said sampled image to generate a corresponding estimated three-dimensional model of the object to be identified;
    (iii) implement at least one identification process to identify said object, said identification process employing data from said estimated three-dimensional models.

24. The system of claim 23, wherein said reference image is a color image and said sampled image is an infrared image.

25. The system of claim 23, wherein said processing system is configured to process said at least one sampled image, wherein said at least one sampled image derives from a range sensing device.

26. The system of claim 23, wherein said reference image is provided from a database.

27. A system for creating a three-dimensional facial model based at least in part on an image of part of a face, the system comprising:
  (a) a two-dimensional image of part of a face;
  (b) a processing system including at least one processor, configured to:
    (i) process said two-dimensional image of part of a face to generate a three-dimensional image of said part of face; and
    (ii) process said three-dimensional image of said part of face using symmetry to generate a full three-dimensional facial model.

* * * * *